April 19, 1955     H. K. HUGHES     2,706,789
APPARATUS FOR MEASURING X-RAY RADIATION ABSORPTION
Filed Dec. 21, 1953     2 Sheets-Sheet 1

INVENTOR
*Harold K. Hughes*
BY *James Y. Cleveland*
ATTORNEYS

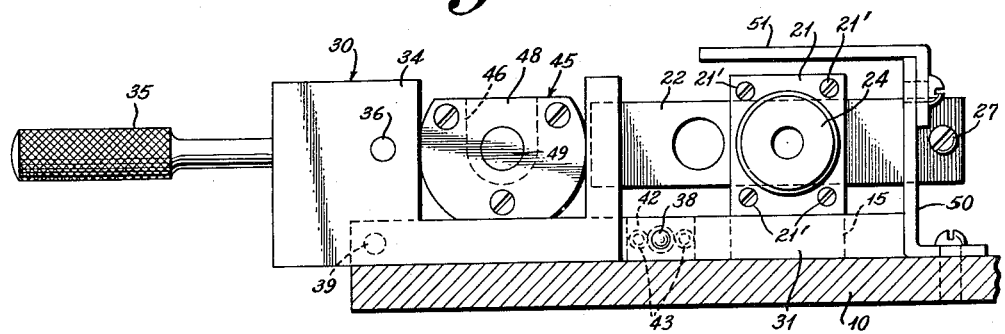
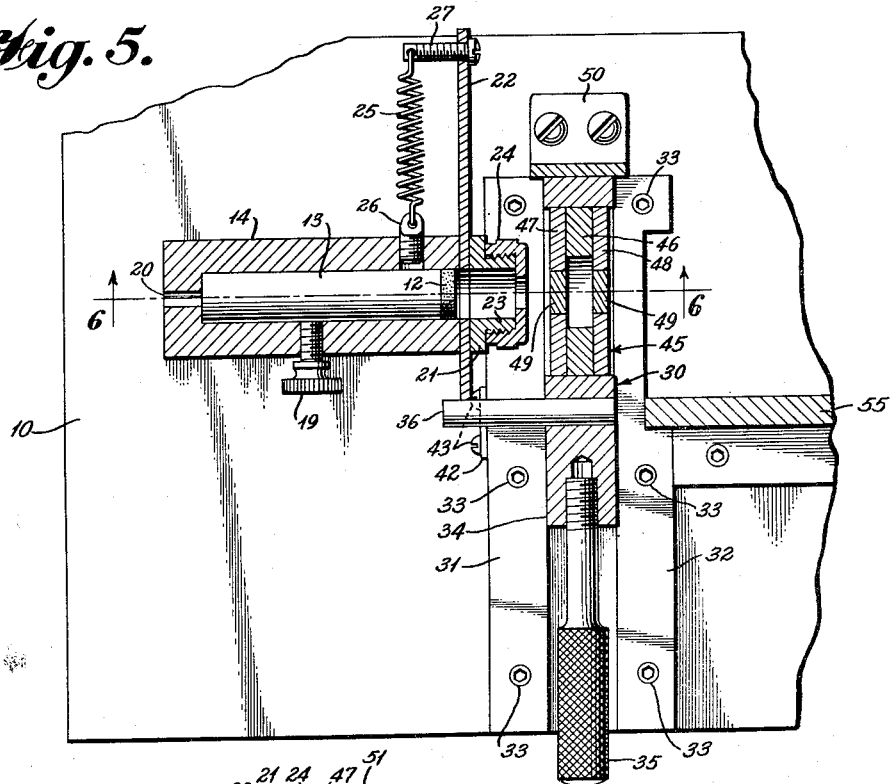
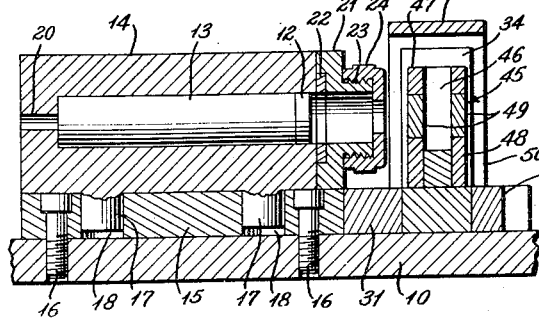
INVENTOR
Harold K. Hughes
BY James Y. Cleveland
ATTORNEYS United States Patent Office 2,706,789
Patented Apr. 19, 1955

2,706,789

APPARATUS FOR MEASURING X-RAY RADIATION ABSORPTION

Harold K. Hughes, Summit, N. J., assignor to Socony-Vacuum Oil Company, Incorporated, a corporation of New York Application December 21, 1953, Serial No. 399,335

1 Claim. (Cl. 250—43.5)

This invention relates to quantitative analysis by means of X-ray radiation absorption and more particularly to a method and apparatus for rapidly and expediently determining such quantitative information as the percent of sulfur in distillate fuel oil. The method depends upon the absorption of substantially monochromatic X-ray radiation by the material under inspection and the apparatus furnishes a means for quickly and expediently carrying out the method in such a simple way that it can be used for routine analysis or plant control work.

It has long been known that compounds absorb gamma radiation or X-rays to different extents. This phenomenon has been utilized to distinguish between different chemical elements to determine quantitatively the percentage of particular elements known to be present in a mixture. Until the time of the present invention, however, the method by which this was accomplished was complicated and difficult of accomplishment and the apparatus was similarly complicated and expensive.

The apparatus used for determining the absorption has heretofore consisted of an X-ray tube for generating a wide band of X-rays, a complicated diffraction arrangement for separating the radiation of various frequencies and complicated measuring and recording mechanism for recording the amount of radiation absorbed at various frequencies.

The result of all of this complication is to take the X-ray absorption method of analysis out of the routine or plant analysis field and make it strictly a research laboratory type of analytical determination.

It is an object of the present invention to provide a greatly simplified method and apparatus for X-ray absorption analysis, which method is so simple that it can be rapidly and expediently performed by relatively unskilled operators as a routine or plant type of analysis.

Basically this invention starts with a source of substantially monochromatic X-ray radiation that is radioactive in nature and of sufficient stability and strength so that it need not be constantly checked for decay so that ultimate measurements can be easily made by commonly available instruments. This eliminates the necessity for an X-ray tube and its source of high voltage, and general complexity. For the purpose of this invention it has been found that one frequency of X-ray radiation not only will suffice for a particular analysis, but that the use of but a single frequency enables the method and apparatus to be greatly simplified.

From the monochromatic source of radiation the monochromatic radiation is passed through a sample of the material to be analyzed, which sample is of predetermined thickness. After passing through this predetermined thickness of sample, the remaining unabsorbed monochromatic radiation is impressed upon a Geiger counter which is connected through a conventional scaling, time-differentiating, or count-rate device to an indicating or recording device. Since the source of X-ray radiation is, to all intents and purposes, constant, the measurement of the X-ray radiation is a direct indication of the amount of absorption that has taken place under fixed conditions, and this, has been found to yield directly the information sought.

In routine or plant analyses the situation often exists where the composition of the material under inspection is well known except for the presence of some element or compound of quite different nature from the nature of the material under inspection. Thus, with fuel oil containing sulfur, the material under inspection is composed almost entirely of hydrocarbons, except for what sulfur is present. The sulfur having a quite different absorption characteristic from the hydrocarbons has a very pronounced effect upon the absorption of monochromatic X-ray radiation, particularly if the X-ray radiation lies near an absorption edge, and when such a material is subjected to examination by the method and apparatus of this invention the variations in X-ray radiation absorption quite accurately reflect the variations in the percentage of sulfur present in the hydrocarbons.

Similarly, in gasoline, the one quantity that will materially affect the monochromatic X-ray radiation absorption of the material under inspection is the quantity of tetraethyl lead present in the gasoline, and this is especially true if the X-ray radiation lies near an absorption edge for lead.

Thus a reading of the instrument of this invention indicating the amount of X-ray radiation absorbed immediately yields the desired information as to the amount of sulfur present in the fuel oil, or the amount of tetraethyl lead present in the gasoline, depending upon what the instrument is arranged to analyze. These are, of course, given only as preferred examples, and other analyses may be made by this same method and apparatus.

All of this may be accomplished without the necessity of X-ray tubes, high voltage source, diffraction crystals, complicated measuring systems, or complicated calculations. The instrument is simply placed in operation and calibrated by the use of samples of materials of the type that are to be analyzed but containing known percentages of the materials in question, and thereafter routine or plant analyses may be made with the apparatus, quite rapidly and quite easily, and the results are accurate enough for all practical purposes.

For a more complete and detailed understanding of this invention and its many advantages, reference may be had to the appended drawings and the following detailed description of the apparatus shown therein.

In the drawings,

Figure 4 is a sectional view of the device shown in Figure 1; the view being taken on line 4—4 of Figure 1;

Figure 5 is a view of a part of the device in horizontal section showing the manner in which the X-ray source is mounted in its holder and showing the sample holder in position so that radiation is passing through the sample;

Figure 6 is a detail view in vertical section taken on line 6—6 of Figure 5;

Figure 1:
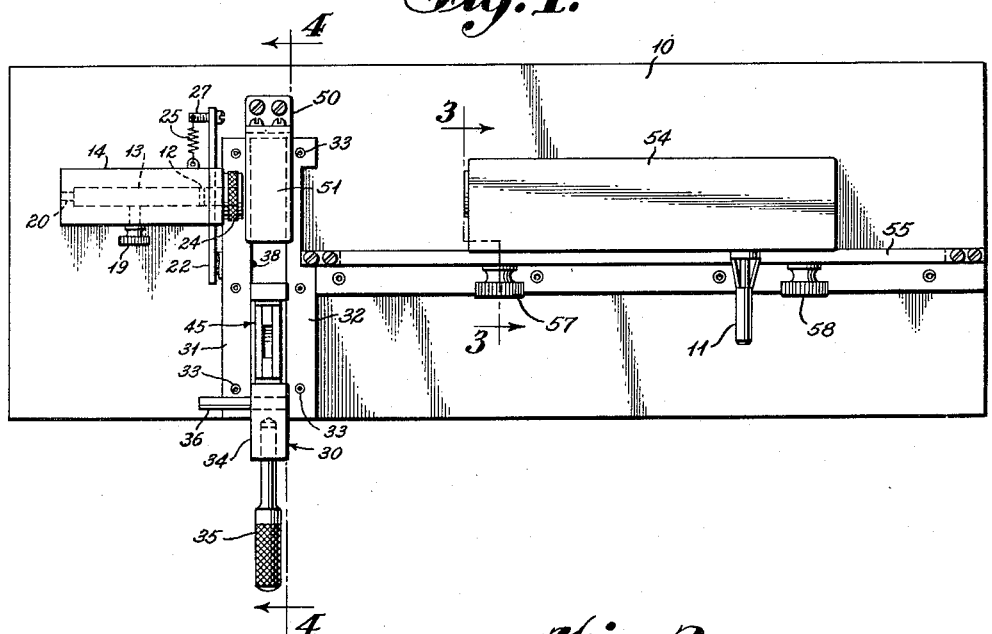
Figure 1 is a plan view of the preferred form of apparatus constructed in accordance with the principles of this invention.

The preferred form of the device of this invention consists of a number of parts mounted on a base 10 as shown in the various figures, and connected by an electrical connection 11 (Figure 1) to a source of voltage for the Geiger counter and an indicator or recorder, not shown, but of conventional type.

The first element of the apparatus of this invention is a source of monochromatic X-ray radiation 12 mounted on the end of a metal rod 13 for convenience in handling. The rod is preferably of brass and the iron 55 is preferably mounted thereon by fusing a small button of the iron to a thin piece of platinum and soldering the platinum to the rod. This protects the iron from oxidation. The rod 13 is mounted, in turn, in a brass block 14, which surrounds the source 12 and thus protects personnel, and this block 14 rests on a spacer 15 which is bolted to the base plate 10 by stud bolts 16. The block 14 is removably held in position on the spacer 15 by means of depending lugs 17 which fit into openings 18 in the spacer, all as shown in Figure 6 of the drawings.

Figure 2:
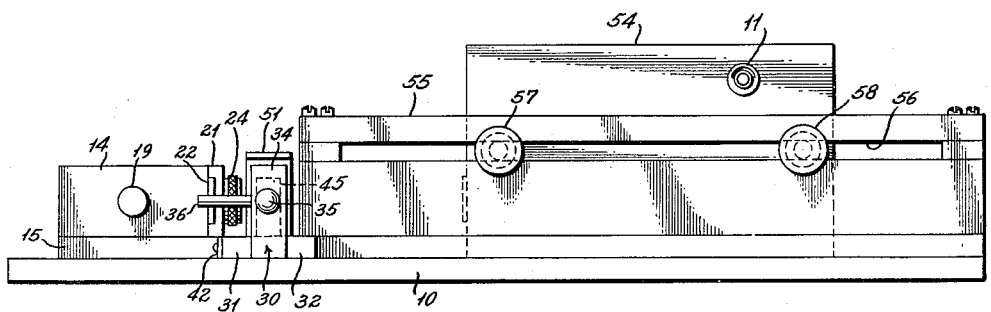
Figure 2 is a side elevation of the same apparatus.
Figure 3:
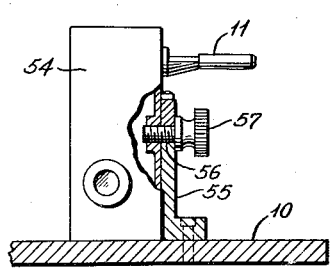
Figure 3 is a detailed view partly in section taken on line 3—3 of Figure 1.

The rod 13 which carries the radioactive material 12 is held in position in the block 14 by a thumb screw 19 as shown in Figures 1, 2 and 5, and a hole 20 is drilled through the rear end of the block 14 so that a rod may be inserted to push the rod 13 out of the block when it is desired to remove it. The right-hand end of the block 14, as shown in Figures 5 and 6 is covered by an end plate 21 which is attached to the block 14 by machine screws 21', Figure 4, and is cut away to form a slot in which a shutter 22 slides. The shutter 22 and the end plate 21 are both drilled to correspond to the rod receiving opening in the block 14, so that when the shutter 22 is in the open position the radiation from the radioactive source 12 is free to pass out of the right-hand end of the assembly, as shown in Figures 5 and 6. The end plate 21 carries a threaded extension 23 surrounding the radiation opening and upon this threaded extension 23 there is mounted a cap 24 which is internally threaded and which is drilled centrally to provide an orifice which regulates the area through which X-ray radiation can freely escape. By providing a series of caps 24 with various sized orifices and changing them as desired, the amount of radiation passed through the sample to the measuring instrument may be regulated.

The nature of the radioactive material 12 is of major importance to this invention. Preferably, for sulfur determinations especially, this material is iron 55 ($Fe^{55}$). Iron 55 has a half life of 2.91 years and emits substantially monochromatic X-ray radiation of a wavelength of approximately 2.06 A. This radiation is near the center of the X-ray band of the ether spectrum, as described and disclosed by the June 1946 number of "Electronics," published by McGraw-Hill Publishing Co., and the half life of iron 55 is such that a small quantity of an isotope will emit sufficient X-ray radiation for easy measurement and yet the decay of the isotope will be slow enough so that the strength of the source will not require continual checking. Furthermore, iron 55 is a solid that can be easily mounted on the end of a metal rod and this rod can be easily handled and inserted in the holder 14. This type of source may be used for four years or more without replacement and requires checking only about once every two weeks.

While iron 55 is the preferred radioactive material of this invention, it is to be understood that other radioactive materials capable of yielding substantially monochromatic X-ray radiation in substantial quantities and yet over a substantial life period, may also be used. Examples of such materials are rhodium 102, cadmium 109 and nickel 59. The radioactive material should emit monochromatic X-ray radiation and should be selected from among those available so that the X-ray radiation will have a wavelength that will be effective for the particular analysis to be performed. When monochromatic radiation is mentioned herein the term is intended merely to indicate the presence of a small number of very narrow wavelength bands and the absence of interfering gamma radiation and not to be concerned with incidental beta radiation or other radiation having no effect on the method of this invention. In tetraethyl lead analysis, for example, a short wavelength emitter should be used.

The shutter 22 which closes the opening through which X-ray radiation is permitted to escape from the housing 14 in the process of making measurements, is normally retained in a closed position by a spring 25 which is connected at one end to a small screw 26 set in the housing 14 and at the other end to a small screw 27 connected to the end of the shutter 22. As will be seen, this shutter is pushed to an open position when a measurement is to be made.

Adjacent to the radioactive material 12 and its holder 14 there is positioned a sample carrier generally designated as 30. This sample carrier moves across in front of the opening in the cap 24 and is guided and positioned by a pair of rails 31 and 32 fastened by bolts 3 to the base 14.

Figure 7:
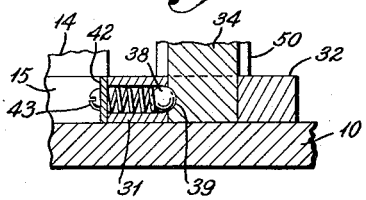
Figure 7 is a detail sectional view showing the detent for holding the sample carriage in place where radiation may pass through the sample.

The carrier 30 consists of a generally U-shaped member 34 to which is threadedly affixed a handle 35 and a transversely extending rod 36 that contacts the shutter 22 when the holder is moved forward into operating position, and thus moves the shutter into open position. Mounted in guide rail 31, as shown in Figure 7, is a small ball and spring detent 38 and the ball of this detent enters a notch 39 in the carrier 30 to hold the carrier in position when it is moved to the forward position. The spring and ball detent 38 are held in position by a small cover plate 42 attached to the carrier by screws 43 as seen in Figures 4 and 5.

Within the U-shaped member 34 there is removably mounted a sample holder 45. This sample holder is comprised of a U-shaped member 46 and two end plates 47 and 48 fastened thereto by machine screws and each having a beryllium or mica window 49 which will retain the fluid under test but will allow radiation to pass therethrough.

A cover plate is also provided to prevent the operator from removing the sample carrier from the slide without withdrawing the slide and closing the shutter 22. This cover plate consists of an angle plate 50 attached to the base plate 10 at the right as shown in Figure 4, and a second angle plate 51 attached to the top of the angle plate 50 and extending to the left and over the sample carrier 45 when it is in position in front of the radiation source.

The detecting mechanism consists of a Geiger counter tube assembly 54 mounted on a frame 55 that extends in a direction parallel to the radiation from the radioactive source and positions the counter tube assembly in direct alignment therewith. The frame 55 is fixed to the base 10 in conventional manner and is made with a slot 56 running lengthwise. The counter tube assembly is connected to this frame by means of two thumb screws 57 and 58 which pass through this slot and can be tightened to tighten the counter tube at any desired position along the frame. Power for operation of the counter tube and signals for the measuring or recording instrument are both conducted through an electrical connection 11 which enters the side of the counter tube assembly as shown in Figures 1 and 2.

The detailed construction of the Geiger counter, the scaler, time-differentiating, or count-rate circuit and the indicating or recording device, are all well known and will not be described here.

The device of this invention is extremely simple to use. It is only necessary for the operator to fill the cavity in the sample carrier 45 with the desired sample, place it in the slide 30 and push the slide 30 into position in front of the source of radiation. This action moves the shutter 22 out of the way and exposes the sample through one of the beryllium windows 49 to the monochromatic X-ray radiation. The rate at which this X-ray radiation is counted by the Geiger counter tube then indicates the percent of the material in question that is present in the sample. This measurement takes only a very short time after which the slide 30 is moved back, the sample carrier 45 removed and emptied and a new sample inserted. The operator is prevented from exposing himself to the radiation by the cover 51 which extends over the path of the radiation and by the shutter 22 that closes in front of the source of radiation when the slide is removed.

The method and apparatus of this invention is particularly well adapted to the determination of sulfur in petroleum products in the range of from 0.05% to 2.7%. If other elements than carbon, hydrogen and sulfur are present in considerable quantities, special corrections must be made. Large variations in carbon-hydrogen ratio also require special correction. In the preferred form of this invention a variation of one-half unit in the carbon-hydrogen ratio changes the apparent sulfur content by 0.044%. However, in most refinery processes the apparatus may be calibrated for the particular type of product being analyzed and the hydrogen-carbon ratio and the percentages of additive materials will be sufficiently constant so as not to introduce any appreciable error into the sulfur determination. It should be borne in mind, however, that the apparatus should be calibrated anew for each different type of product, that is, for each change in addition agent percentage or change in carbon-hydrogen ratio.

Temperature has an effect upon the determinations by this method and apparatus and the method should either be performed at a standard temperature, or temperature corrections determined and calculated into the results.

Many modifications and variations of the device described here will be apparent to those skilled in the art and such modifications and variations are considered to be within the scope of this invention.

What is claimed is:

An X-ray absorption spectrometer that comprises in combination a base; a holder for a source of X-ray radiation quick detachably mounted on the base; a source of radiation disposed within said holder, said holder having an aperture in one end thereof to collimate the radiations; a shutter wholly supported by said holder and normally biased to a position closing said aperture; a set of parallel ways mounted on the base transversely thereof in front of the source holder; a cell adapted to contain a sample that it is desired to test, said cell having beryllium windows in opposite faces thereof; a carriage adapted to receive the sample cell and to move in the parallel ways to locate the cell in front of the aperture of the radiation source holder; means for moving the sample cell carriage along the ways to a point where the beryllium windows in the sample cell are in alignment with the aperture in the radiation source holder; means responsive to alignment of the cell and aperture to open said shutter; means for detecting radiation transmitted by the sample contained in the cell and measuring the intensity thereof as an index to the properties of the sample undergoing test; and means mounting said detecting means in alignment with the aperture in the radiation source holder for axial adjustment with respect thereto.

References Cited in the file of this patent

UNITED STATES PATENTS

| | | |
|---|---|---|
| 1,993,058 | Hahn | Mar. 5, 1935 |
| 2,051,317 | Sheard et al. | Aug. 18, 1936 |
| 2,483,500 | Long | Oct. 4, 1949 |
| 2,502,683 | Wannier | Apr. 4, 1950 |
| 2,540,261 | Herzog | Feb. 6, 1951 |
| 2,551,491 | Gilks | May 1, 1951 |
| 2,584,962 | Gross | Feb. 5, 1952 |
| 2,617,942 | McLachlan, Jr. et al. | Nov. 11, 1952 |
| 2,635,192 | Cordovi | Apr. 14, 1953 |
| 2,645,720 | Gross | July 14, 1953 |
| 2,674,695 | Grace, Jr. | Apr. 6, 1954 |